United States Patent
Royston

(10) Patent No.: US 9,064,253 B2
(45) Date of Patent: Jun. 23, 2015

(54) SYSTEMS AND METHODS FOR PROVIDING NFC SECURE APPLICATION SUPPORT IN BATTERY ON AND BATTERY OFF MODES

(75) Inventor: Philip Stewart Royston, Berkshire (GB)

(73) Assignee: Broadcom Corporation, Irvine, CA (US)

( * ) Notice: Subject to any disclaimer, the term of this patent is extended or adjusted under 35 U.S.C. 154(b) by 135 days.

(21) Appl. No.: 13/335,003

(22) Filed: Dec. 22, 2011

(65) Prior Publication Data

US 2013/0144793 A1 Jun. 6, 2013

Related U.S. Application Data

(60) Provisional application No. 61/565,810, filed on Dec. 1, 2011.

(51) Int. Cl.
G06Q 20/00 (2012.01)
G06Q 20/32 (2012.01)

(52) U.S. Cl.
CPC .................................. *G06Q 20/3255* (2013.01)

(58) Field of Classification Search
USPC .......................................................... 705/65
See application file for complete search history.

(56) References Cited

U.S. PATENT DOCUMENTS

| | | | | |
|---|---|---|---|---|
| 4,261,037 A * | 4/1981 | Hicks | ............................ | 705/412 |
| 4,399,510 A * | 8/1983 | Hicks | ............................ | 705/412 |
| 5,717,608 A * | 2/1998 | Jensen | ............................ | 702/130 |
| 7,057,372 B2 * | 6/2006 | Chen et al. | ............................ | 320/106 |
| 7,233,948 B1 * | 6/2007 | Shamoon et al. | ............................ | 1/1 |
| 7,426,750 B2 * | 9/2008 | Cooper et al. | ............................ | 726/26 |
| 7,627,343 B2 * | 12/2009 | Fadell et al. | ............................ | 455/557 |
| 7,689,532 B1 * | 3/2010 | Levy | ............................ | 713/176 |
| 7,719,830 B2 * | 5/2010 | Howarth et al. | ............................ | 361/679.41 |
| 7,873,852 B2 * | 1/2011 | Bell | ............................ | 713/340 |
| 8,677,168 B2 * | 3/2014 | Pocklington et al. | ............................ | 713/340 |
| 8,719,605 B2 * | 5/2014 | Chakra et al. | ............................ | 713/320 |
| 8,893,007 B2 * | 11/2014 | Vadde et al. | ............................ | 715/736 |
| 2001/0051996 A1 * | 12/2001 | Cooper et al. | ............................ | 709/217 |
| 2004/0268159 A1 * | 12/2004 | Aasheim et al. | ............................ | 713/300 |
| 2007/0150759 A1 * | 6/2007 | Srinivasan et al. | ............................ | 713/300 |
| 2007/0220291 A1 * | 9/2007 | Stufflebeam | ............................ | 713/320 |
| 2007/0220293 A1 * | 9/2007 | Takase | ............................ | 713/320 |
| 2008/0141048 A1 * | 6/2008 | Palmer et al. | ............................ | 713/300 |
| 2008/0307243 A1 * | 12/2008 | Lee | ............................ | 713/320 |
| 2008/0313640 A1 * | 12/2008 | Liu et al. | ............................ | 718/104 |
| 2009/0006570 A1 * | 1/2009 | Forstall et al. | ............................ | 709/206 |
| 2009/0013204 A1 * | 1/2009 | Kobayashi et al. | ............................ | 713/340 |
| 2009/0119673 A1 * | 5/2009 | Bubba | ............................ | 718/104 |
| 2009/0259936 A1 * | 10/2009 | Tanskanen et al. | ............................ | 715/700 |

(Continued)

OTHER PUBLICATIONS

European Search Report for EP Application No. EP 12 00 5756, Munich, Germany, mailed on May 2, 2013 (3 pages).

*Primary Examiner* — Evens J Augustin
(74) *Attorney, Agent, or Firm* — Sterne, Kessler, Goldstein & Fox PLLC

(57) ABSTRACT

Systems and methods for providing secure application support for NFC devices in both battery on and battery off modes are provided. A first application that requires available host battery supply and a second application that does not require available host battery supply are loaded onto a mobile device. When the second application is enabled, the reader requests user input on a POS device. The first application is enabled when host battery supply is available, and the second application is enabled when no host battery supply is available.

19 Claims, 10 Drawing Sheets

(56) References Cited

U.S. PATENT DOCUMENTS

| | | | |
|---|---|---|---|
| 2009/0291634 A1 | 11/2009 | Saarisalo | |
| 2009/0300399 A1* | 12/2009 | Archer et al. | 713/340 |
| 2009/0309541 A1* | 12/2009 | Walrath | 320/107 |
| 2009/0327772 A1* | 12/2009 | Lee et al. | 713/300 |
| 2010/0023788 A1* | 1/2010 | Scott et al. | 713/320 |
| 2010/0029202 A1* | 2/2010 | Jolivet et al. | 455/41.1 |
| 2010/0248710 A1 | 9/2010 | Sklovsky et al. | |
| 2011/0117839 A1 | 5/2011 | Rhelimi | |
| 2011/0244796 A1 | 10/2011 | Khan et al. | |
| 2012/0047379 A1* | 2/2012 | Chen et al. | 713/320 |

* cited by examiner

FIG. 7A

| AID | Location | Instructions |
|---|---|---|
| A000000000001 | MEM1 | CMD1 |
| A000000000002 | MEM2 | CMD2 |
| A000000000003 | MEM1 | CMD3 |

FIG. 7B

| AID | Location | Instructions | Battery Off Mode Enabled |
|---|---|---|---|
| A000000000001 | MEM1 | CMD1 | 0 |
| A000000000002 | MEM2 | CMD2 | 1 |
| A000000000003 | MEM1 | CMD3 | 0 |
| A000000000004 | MEM3 | CMD4 | 1 |

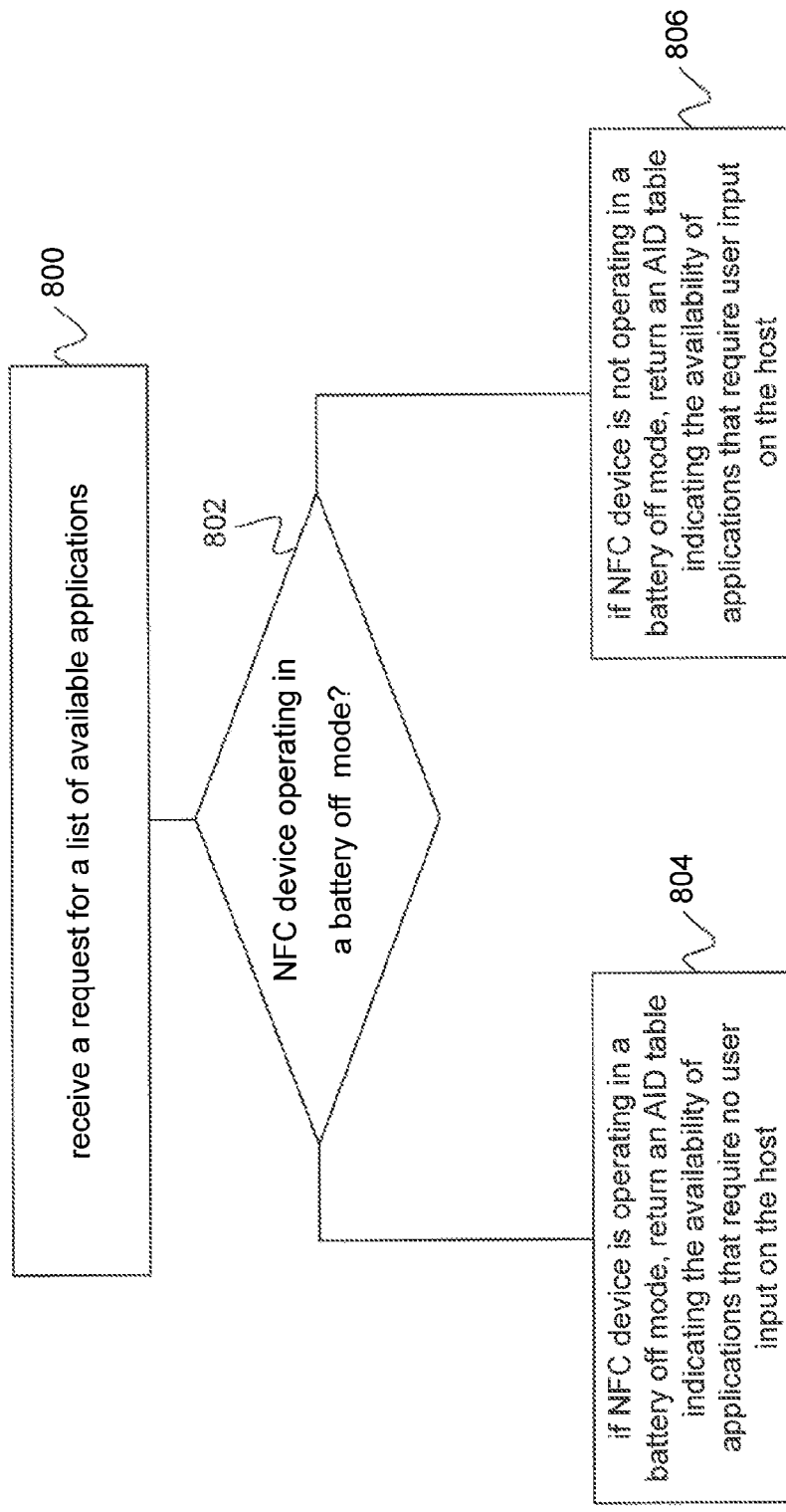

US 9,064,253 B2

SYSTEMS AND METHODS FOR PROVIDING NFC SECURE APPLICATION SUPPORT IN BATTERY ON AND BATTERY OFF MODES

CROSS-REFERENCE TO RELATED APPLICATIONS

This application claims the benefit of U.S. Provisional Patent Application No. 61/565,810, filed on Dec. 1, 2011, which is incorporated by reference herein in its entirety.

FIELD OF THE INVENTION

This invention relates to communications and more specifically to near field communications (NFC).

BACKGROUND OF THE INVENTION

Some NFC device applications require relatively high power for execution. For example, some NFC device applications require interaction with the host device. If the host device does not have sufficient battery power to operate, these NFC device applications cannot perform required tasks because host device functionality is not available. For example, some NFC device applications can require user input from a host mobile device (e.g., user input from a keyboard or number pad on the host mobile device). Other NFC device applications do not require relatively high power for execution and can be supported using harvested energy. These applications may be able to perform required tasks without requiring the host device to be powered up.

Some financial applications require entry of a personal identification number (PIN). Certification requirements for supporting contactless financial applications in mobile devices stipulate that financial applications such as credit card transactions cannot be supported when no host power is available, as the mobile device host is not powered and a PIN cannot be entered on the mobile device.

However, some NFC device applications can receive data from a PIN entered at a point of sale (POS). Thus, these applications do not require host power. What is needed are systems and methods for providing secure application support for NFC devices in both battery on and battery off modes.

BRIEF DESCRIPTION OF THE DRAWINGS/FIGURES

The accompanying drawings, which are incorporated in and constitute part of the specification, illustrate embodiments of the invention and, together with the general description given above and the detailed descriptions of embodiments given below, serve to explain the principles of the present invention.

FIG. 7A shows a block diagram of an AID table in accordance with embodiments of the present disclosure.

FIG. 7B shows a block diagram of an AID table including battery off enabled flags in accordance with embodiments of the present disclosure.

Figure 1:
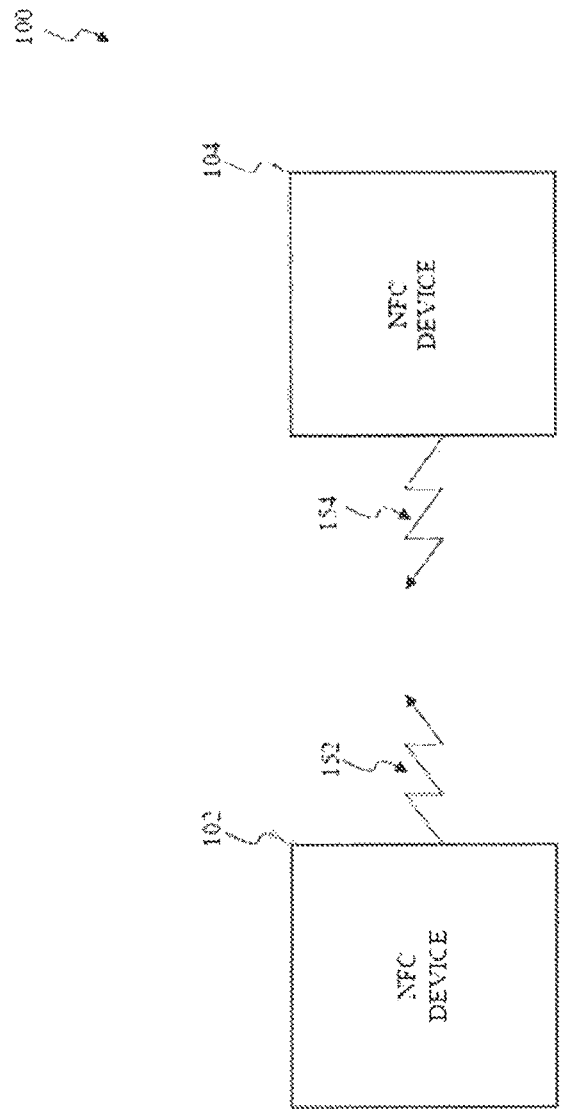
FIG. 1 illustrates a block diagram of a NFC environment.

FIG. 8 is a flowchart of a method for providing secure application support for NFC devices in both battery on and battery off modes in accordance with embodiments of the present disclosure Features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

In the following description, numerous specific details are set forth to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. Overview

Embodiments of the present disclosure provide systems and methods for secure application support for NFC devices in both battery on and battery off modes. Both an application that requires available host battery supply and an application that does not require available host battery supply are loaded onto a secure element (SE) of a host mobile device. One of the two applications is selected based on the power mode of the NFC device.

For example, in the case of a credit card application, two applications can be loaded onto the mobile device: (1) a mobile device banking application that interacts with the mobile device host to request PIN entry on the host; and (2) a contactless smart card banking application which emulates a contactless credit card. The first application is enabled when host battery supply is available (i.e., when the NFC device is operating in full power mode), and the second application is enabled when no host battery supply is available (i.e., when the NFC device is operating in battery off mode).

2. NFC Systems and Environments 2.1 NFC Environments

FIG. 1 illustrates a block diagram of a NFC environment according to an exemplary embodiment of the disclosure. A NFC environment 100 provides wireless communication of information, such as one or more commands and/or data, among a first NFC device 102 and a second NFC device 104 that are sufficiently proximate to each other. The first NFC device 102 and/or the second NFC device 104 may be implemented as a standalone or a discrete device or may be incorporated within or coupled to another electrical device or host device such as a mobile telephone, a portable computing device, another computing device such as a laptop, tablet computer, or a desktop computer, a computer peripheral such as a printer, a portable audio and/or video player, a payment system, a ticketing writing system such as a parking ticketing system, a bus ticketing system, a train ticketing system or an entrance ticketing system to provide some examples, or in a ticket reading system, a toy, a game, a poster, packaging, advertising material, a product inventory checking system and/or any other suitable electronic device that will be apparent to those skilled in the relevant art(s) without departing from the spirit and scope of the disclosure. Herein, when incorporated within or coupled to another electrical device or host device, this type of NFC device may be referred to as a NFC capable device.

The first NFC device 102 generates a magnetic field and probes the magnetic field for the second NFC device 104. The first NFC device 102 and the second NFC device 104 may be implemented using a Type A standard, a Type B standard, a Type F (FeliCa) standard, and/or a vicinity standard. The Type A and Type B standards are further defined in the "NFC Forum: NFC Activity Specification: Technical Specification, NFC Forum™ Activity 1.0 NFCForum-TS-Activity-1.0," published Nov. 18, 2010 (hereinafter the "NFC Activity Specification") and/or ISO/IEC 14443-3, "Identification cards—Contactless integrated circuit(s) cards—Proximity cards—Part 3: Initialization and anticollision," published on Jun. 11, 1999, which are incorporated herein by reference in their entirety. The Type F standard is further defined in the NFC Activity Specification. The Vicinity standard is further defined in ISO/IEC 15693-3:2009, "Identification cards—Contactless integrated circuit(s) cards—Vicinity cards—Part 3: Anti-collision and transmission protocol," published on Apr. 6, 2009 (hereinafter the "Vicinity Specification").

Upon establishing communication with the second NFC device 104, the first NFC device 102 modulates its corresponding information onto the first carrier wave and generates the first magnetic field by applying the modulated information communication to a first antenna of the first NFC device to provide the first information communication 152. The first NFC device 102 continues to apply the first carrier wave without its corresponding information to continue to provide the first information communication 152 once the information has been transferred to the second NFC device 104. The first NFC device 102 is sufficiently proximate to the second NFC device 104 such that the first information communication 152 is inductively coupled onto a second antenna of the second NFC device 104.

The second NFC device 104 derives or harvests power from the first information communication 152 to recover, to process, and/or to provide a response to the information. The second NFC device 104 demodulates the first information communication 152 to recover and/or to process the information. The second NFC device 104 may respond to the information by applying its corresponding information to the first carrier wave that is inductively coupled onto the second antenna to provide the second modulated information communication 154.

Further operations of the first NFC device 102 and/or the second NFC device 104 may be described in International Standard ISO/IEC 18092:2004(E), "Information Technology—Telecommunications and Information Exchange Between Systems—Near Field Communication—Interface and Protocol (NFCIP-1)," published on Apr. 1, 2004 and International Standard ISO/IEC 21481:2005(E), "Information Technology—Telecommunications and Information Exchange Between Systems—Near Field Communication—Interface and Protocol-2 (NFCIP-2)," published on Jan. 15, 2005, each of which is incorporated by reference herein in its entirety.

Figure 2:
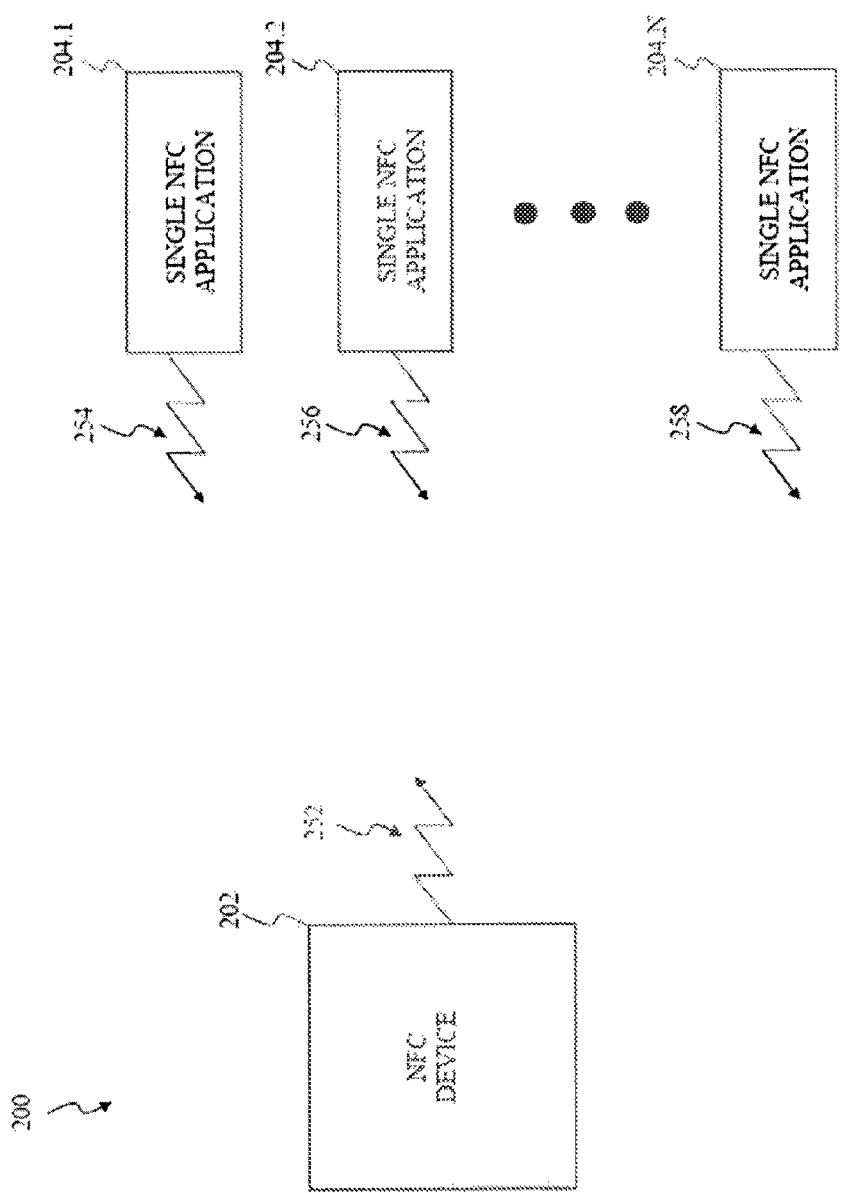
FIG. 2 illustrates a block diagram of a multiple-device NFC environment.

FIG. 2 illustrates a conventional multi-device environment. NFC environment 200 provides wireless communication of information, such as one or more commands and/or data, among a first NFC device 202 and a plurality of second NFC devices 204.1-204.N that are sufficiently proximate to the first NFC device 202. As indicated above for FIG. 1, the first NFC device 202 and/or the second NFC devices 204.1-204.N may be implemented as standalone or discrete devices or may be incorporated within or coupled to other electrical devices or host devices. In FIG. 2, each of the second NFC devices 204.1-204.N has a single identity associated with it, such as a ticket, credit card, identification, etc. These devices 204.1-204.N may be a plurality of NFC devices such as smart cards, tokens, and/or mobile computing devices kept within a wallet, purse, or similar portable item. There is no restriction on the number of second NFC devices 204.1-204.N that may be available to respond to the first NFC device 202, subject to practical limitations such as space or power available from a reader field.

In this environment, when first NFC device 202 polls for a second NFC device 204.1-204.N, each second NFC device 204.1-204.N responds if it is the type of NFC device which the first NFC device 202 has polled for. An example of the polling procedure is described in the NFC Activity Specification and "NFC Forum: NFC Digital Protocol: Technical Specification, NFC Forum™ Digital 1.0 NFCForum-TS-DigitalProtocol-1.0," published Nov. 17, 2010 (hereinafter the "NFC Digital Protocol"), which are incorporated by reference herein in their entirety. The conventional polling procedure contemplates multiple standards, including the Type A standard, the Type B standard, and the Type F standard.

Typically, there is a certain probability that each second NFC device 204.1-204.N will respond at a different time; otherwise, a collision will occur. NFC Activity Specification and/or ISO/IEC 14443-3 and/or the Vicinity Specification provide for anticollision in such situations. Since each second NFC device 204.1-204.N has only one identity associated with it, they do not have any difficulty determining how to respond, and responding, to the first NFC device 202's poll when their identity matches. It is also possible to emulate multiple identities on a single NFC device. Such a NFC device is a multiple-identity device, because it emulates multiple identities.

2.2 NFC Devices

Figure 3:
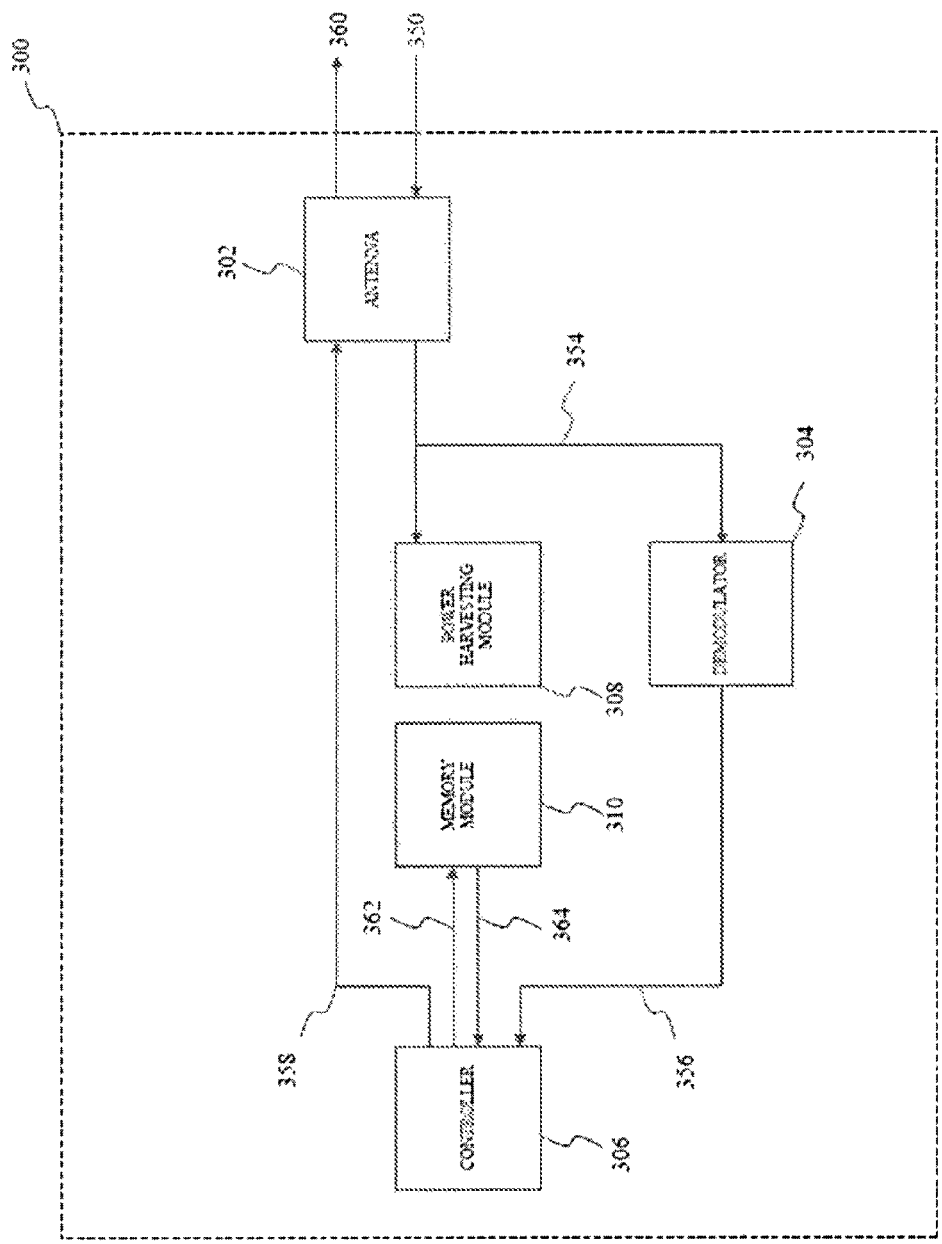
FIG. 3 illustrates a block diagram of an NFC device.

FIG. 3 illustrates a block diagram of a NFC device that may be used according to an exemplary embodiment of the disclosure. A NFC device 300 is configurable to operate in a target, or tag, mode of operation to respond to a polling command from a second NFC capable device, such as the NFC device 102 or the NFC device 104 to provide some examples, in a polling mode of operation. The NFC device 300 may represent a NFC tag or a NFC communicator. A NFC reader is a type of NFC device that is capable of operating in an initiator mode to initiate a communication with another NFC enabled device. A NFC tag is a type of NFC device that is capable of operating in the target mode to respond to the initiation of a communication by another NFC enabled device. A NFC communicator is a type of NFC device that is capable of operating in the initiator mode or in the target mode and is capable of switching between these two modes.

The NFC device 300 may represent a standalone or a discrete device or may represent a NFC capable device. Since the second NFC capable device may be configured substantially similarly to the NFC device 300, the following description focuses on describing the NFC device 300. The NFC device 300 may have a plurality of identities associated with it, such as a ticket, credit card, identification, etc. The NFC device 300 includes an antenna module 302, a demodulator module 304, a controller module 306, a power harvesting module 308, and a memory module 310. The NFC device 300 may represent an exemplary embodiment of the NFC device 104.

The antenna module 302 inductively receives a communications signal 350 from the second NFC capable device to provide a recovered communications signal 354. Typically, the received communications signal 350 includes a polling command that has been modulated by the second NFC capable device.

The demodulator module 304 demodulates the recovered communications signal 354 using any suitable analog or digital modulation technique to provide a recovered command 356. The recovered command 356 may be the polling command. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s).

When the demodulator module 304 is within a Type A tag field, it detects polling commands based on 100% ASK modulation. The voltage amplitude must drop substantially to zero, such that the demodulator module 304 functions as a gap detector for Type A tags. In this situation, any modulation based on another modulation scheme that does not drop below the threshold required for Type A tags may be given the digital value of 1. When the amplitude drops low enough, the demodulator module 304 gives it the digital value of 0 in accord with the modified Miller coding scheme.

When the demodulator module 304 is within a Type B tag field, it detects polling commands based on 10% ASK modulation. The demodulator module 304 has a voltage threshold that is at 90% of the total modulation amplitude. If the polling command's modulation decreases below that threshold, the demodulator module 304 gives it the digital value of 0 in accord with the NRZ-L coding scheme. In this situation, any modulation based on another protocol may drop below the threshold required for Type B tags and therefore be given the digital value of 0. Any modulation that remains above this threshold would be given the digital value of 1.

When the demodulator module 304 is within a Type F tag field, it detects polling commands based on a Manchester coding scheme that uses a modulation threshold between that used for Type A and that used for Type B tags. If the polling command's modulation decreases below this threshold, it will be given the digital value of 0. Any modulation that remains above this threshold would be given the digital value of 1.

As can be seen from the above, a Type A tag will not assign a digital value of 0 to any modulation based on Type B or Type F tags because the modulation amplitude would not fall below the threshold required for 100% ASK modulation. Thus, the demodulator module 304 in a Type A tag would not detect a polling command sent to detect a Type B or Type F tag.

When the demodulator module 304 is within a Vicinity standard tag field, it detects polling commands based on either 10% or 100% ASK modulation, depending on the choice of modulation by the reader. When using 100% ASK modulation, the voltage amplitude must drop substantially to zero, such that the demodulator module 304 functions as a gap detector for Vicinity standard tags. In this situation, any modulation based on another modulation scheme that does not drop below the threshold required for Vicinity standard tags may be given the digital value of 1. When the amplitude drops low enough, the demodulator module 304 gives it the digital value of 0 in accord with pulse position modulation.

When using 10% ASK modulation with the Vicinity standard, the demodulator module 304 has a voltage threshold that is at 90% of the total modulation amplitude. If the polling command's modulation decreases below that threshold, the demodulator module 304 gives it the digital value of 0 in accord with the pulse position modulation coding scheme. In this situation, any modulation based on another protocol may drop below the threshold required for Vicinity standard tags and therefore be given the digital value of 0. Any modulation that remains above this threshold would be given the digital value of 1.

Moving on to other aspects of the NFC device 300, the controller module 306 controls overall operation and/or configuration of the NFC device 300. The controller module 306 sends a list search command 362 to the memory module 310 when the NFC device 300 supports a plurality of identities. The control module 306 receives list search response 364 with the first identity that matches the polling command characteristic(s). The controller module 306 then provides a response 358 to the recovered command 356, which incorporates list search response 364 when responding to a polling command.

Typically, the second NFC capable device inductively couples a carrier wave on the antenna module 302 as the received communications signal 350 after it has transferred the polling command to the NFC device 300. The controller module 306 modulates this carrier wave in accordance with the response 358 to provide a transmitted communications signal 360. For example, an impedance of the antenna module 302 varies based upon the response 358 to vary a load of the NFC device 300 as seen by the second NFC capable device.

The power harvesting module 308 may harvest power for the NFC device 300 from the recovered communications signal 354. The power couplings from the power harvesting module 308 that supply the power to other modules of the NFC device 300, such as the antenna module 302, the demodulator module 304, the controller module 306, and/or the memory module 310, are not shown in FIG. 3. Alternatively or additionally, a battery can be provided.

The memory module 310 stores a list of the plurality of identities associated with the NFC device 300. When the received communications signal 350 is a polling command which has been modulated from the second NFC capable device, the memory module 310 receives the list search command 362 in order to search the list of the plurality of identities associated with the NFC device 300. Once a match to the characteristics of the polling command is found, the memory module 310 returns the corresponding identity as list search response 364. For example, this match may represent a first identity from among the plurality of identities that matches to the characteristics of the polling command, referred to as a first match.

2.3 NFC Device Integration into Host Device

Figure 4A:
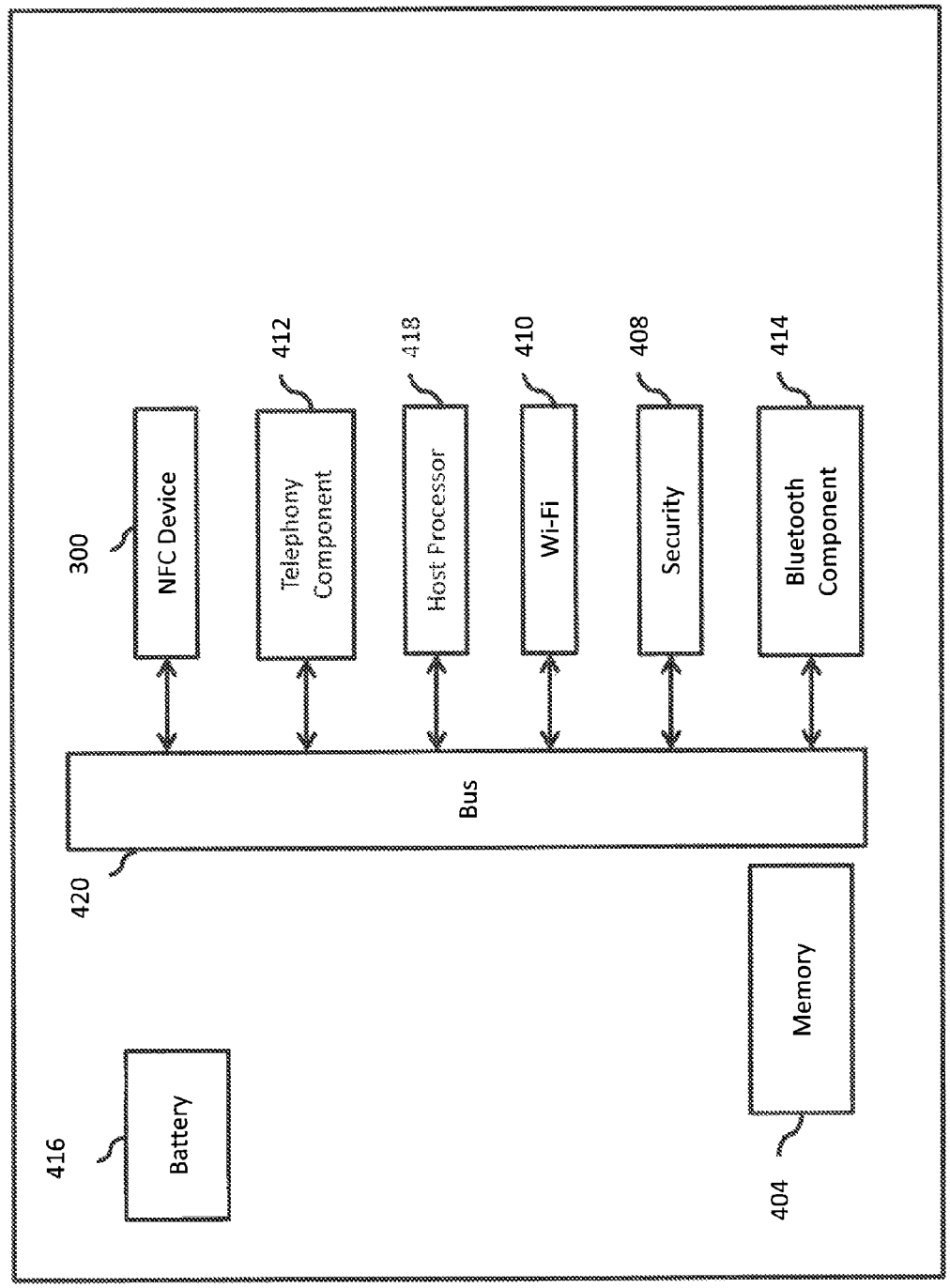
FIG. 4A shows a block diagram illustrating integration of an NFC device into an electronic host communications device with a shared memory according to embodiments of the present disclosure.

NFC devices (such as NFC device 300) may be integrated into a host communications device (e.g., a host mobile phone). FIG. 4A shows a block diagram illustration integration of NFC device 300 into electronic host communications device 400 with a shared memory 404 according to embodiments of the present disclosure. In an embodiment, the electronic communications device 400 includes the NFC device 300, the memory 404, a security component 408, a WI-FI component 410, a telephony component 412, a Bluetooth component 414, a battery 416 used to power the communications device, a host processor 418, and a bus 420. It should be understood that components 412, 418, 410, 408, and 414 are optional and are provided to illustrate components that may be incorporated into a host communications device. It should further be understood that, according to embodiments of the present disclosure, one, several, all, or none of components 412, 418, 410, 408, and 414 may be incorporated into the host communications device 400.

According to embodiments of the present disclosure, host communications device 400 may represent a number of electronic communications devices including, but not limited to, mobile telephones, portable computing devices, other computing devices such as personal computers, laptops, desktop computers, computer peripherals such as printers, portable audio and/or video players, payment systems, ticket writing systems such as parking ticket systems, bus ticketing systems, train ticketing systems, or entrance ticketing systems.

In an embodiment, NFC devices and/or NFC controllers are designed to include secure element(s) that use a secure external memory. In an embodiment, this secure external memory is provided by a host mobile device (e.g., memory 404). In another embodiment, this secure external memory is provided by a dedicated additional non-volatile memory chip, such as flash or EE memory. Utilizing this external memory enables the NFC device and/or NFC controller to be manufactured using 40 nm process technology, which does not necessarily support non-volatile memory.

Using an external memory has some disadvantages, however. For example, when a host device (e.g., electronic communications device 400) is operating in a battery off mode (or a low battery mode), NFC device 300 may not be able to harvest (e.g., using power harvesting module 308) enough energy to power the host device as well as the NFC device circuitry. This is especially true if the NFC device uses a small antenna (e.g., antenna module 302).

Figure 4B:
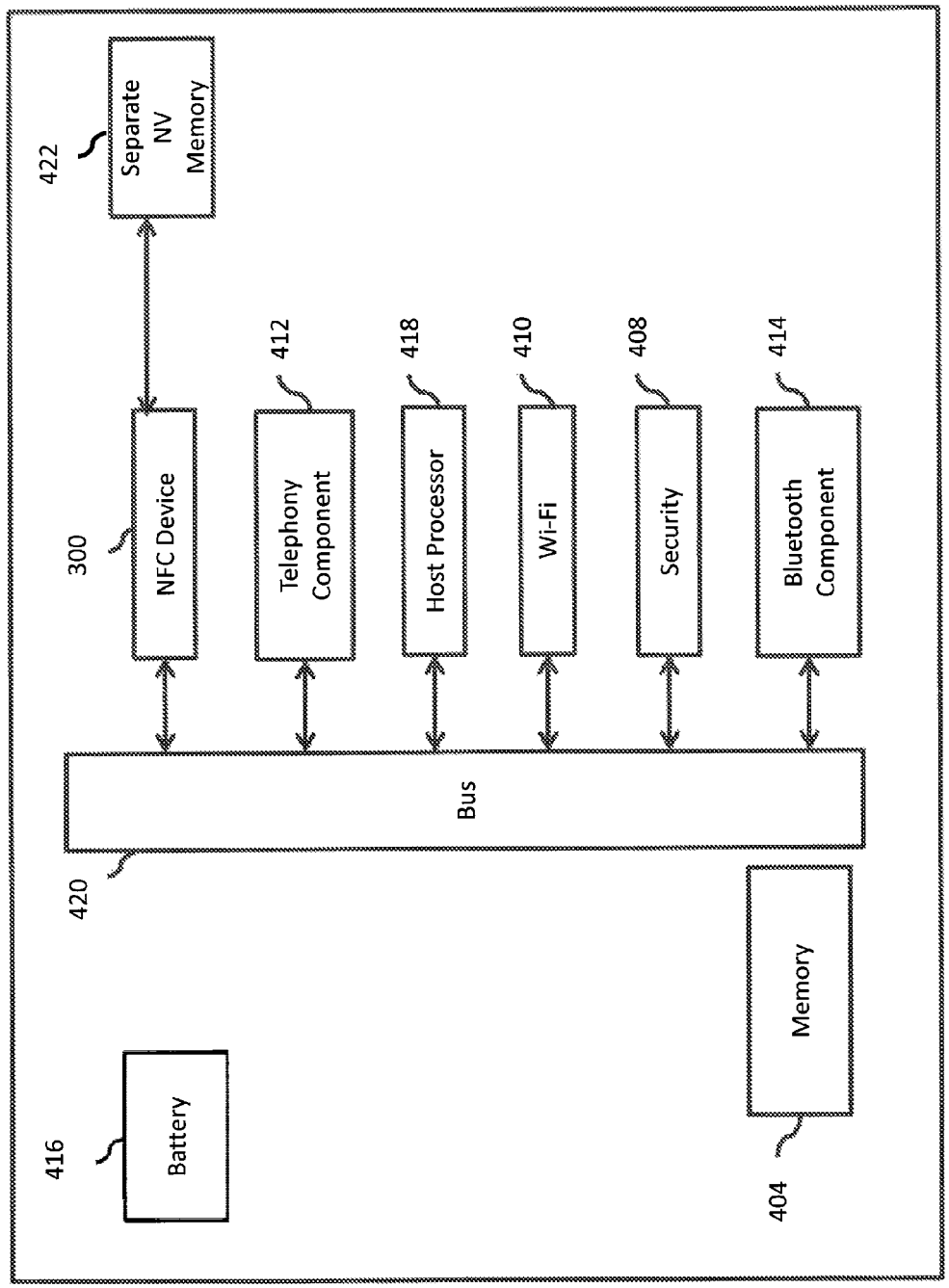
FIG. 4B shows the integration of a separate nonvolatile (NV) memory into the block diagram of FIG. 4A.
Figure 4C:
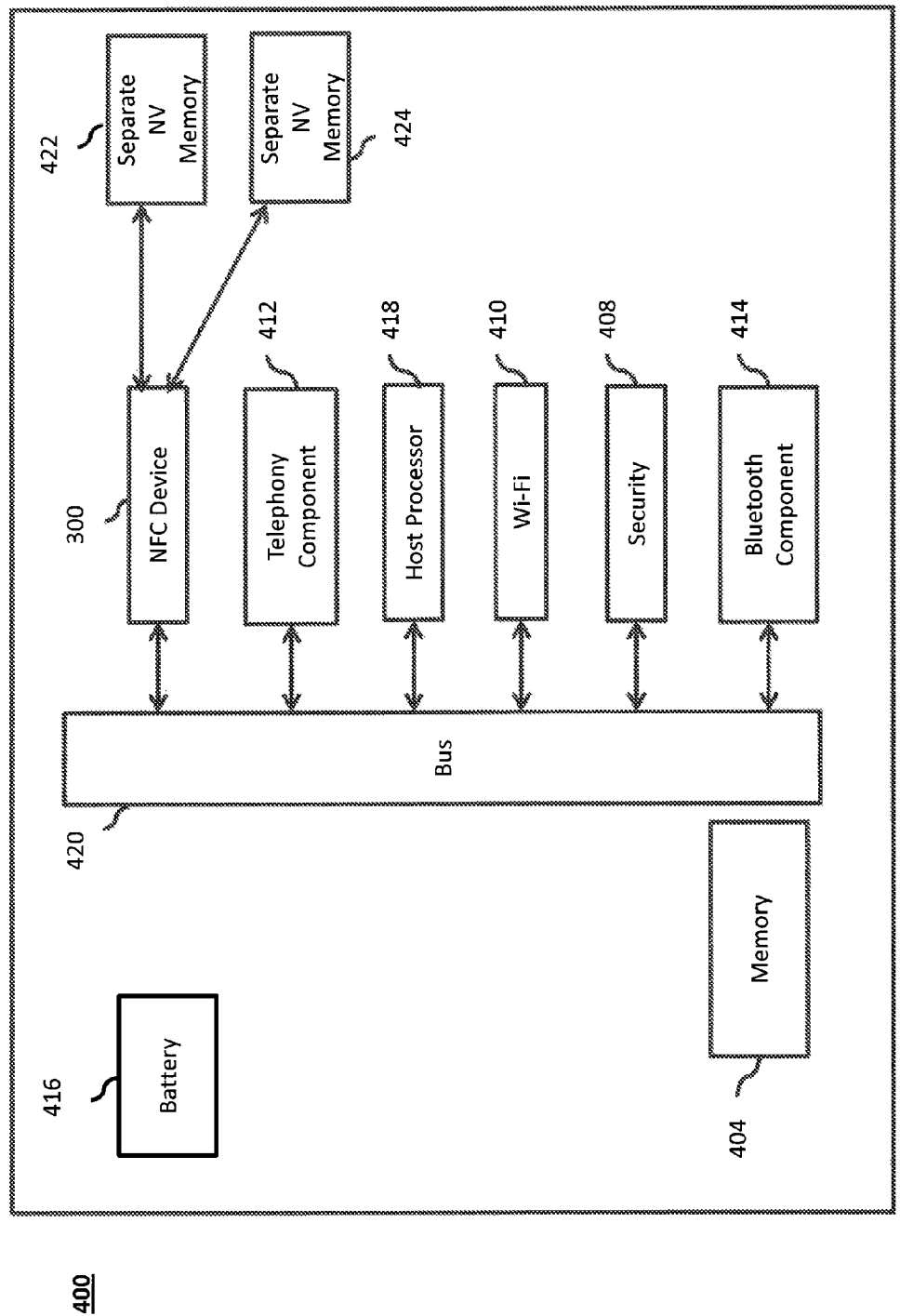
FIG. 4C shows the implementation of an additional separate NV memory into the block diagram of FIG. 4A.

One solution to this problem is to use a separate nonvolatile memory that is not shared by the host device. FIG. 4B shows the integration of this separate nonvolatile (NV) memory 422. As previously discussed, separate NV memory 422 may be flash or EE memory, and, in an embodiment, separate NV memory 422 is a secure memory. For example, data stored in separate NV memory 422 is encrypted for protection while in a non-secure device (e.g., host communications device 400). NFC device 300 can thus harvest energy using power harvesting module 308 and access memory from separate NV memory 422 without having to power-up all the other components of host communications device 400. It should be understood that while one separate NV memory 422 is shown in FIG. 4B, embodiments of the present disclosure incorporate multiple separate NV memories. For example, FIG. 4C shows the implementation of an additional separate NV memory 424 into host communications device 400.

3. Providing Application Support in Battery on and Battery off Mode

Some NFC device applications require relatively high power for execution. For example, some NFC device applications require interaction with the host device. If the host device does not have sufficient battery power to operate, these NFC device applications cannot perform required tasks because host device functionality is not available. For example, some NFC device applications can require user input from a host mobile device (e.g., user input from a keyboard or number pad on the host mobile device). Other NFC device applications do not require relatively high power for execution and can be supported using harvested energy. These applications may be able to perform required tasks without requiring the host device to be powered up.

For example, some financial applications require entry of a PIN. Certification requirements for supporting contactless financial applications in mobile devices stipulate that financial applications such as credit card transactions cannot be supported when no host power is available (i.e., when the NFC device is operating in a battery off mode), as the mobile device host is not powered and a PIN cannot be entered on the mobile device. However, some NFC device applications can receive data from a PIN entered at a point of sale (POS). Thus, if a NFC device financial application can receive data from a PIN entered at a POS device and can execute the financial application using harvested power, this financial application can be executed in a battery off mode.

For example, contactless smart card banking applications can emulate a contactless credit card without requiring full battery power. Thus, contactless smart card emulation functionality can be supported by an NFC device in a battery off mode or a battery low mode, because the NFC device sending the contactless smart card information does not have to be supported by host battery power. Further, in some cases, the encryption of a secure memory block may be protected by an OTP (one time programmable) memory within a secure controller (used to count each change of the secure memory), and this type of memory can also require larger amounts of energy to program if an associated NV memory needs to be modified.

In another example, a ticketing application (e.g., a bus, train, or airline ticketing application or an application for an amusement park that keeps track of a user's tickets for rides) may require user input (e.g., authorization from a user by entering a PIN or by selecting "yes" or "no" from a keypad when prompted). If the host device is not powered up, applications that require user input on the host device may not be able to be executed, but applications that interact with an external device (e.g., a POS device) may be able to harvest enough energy to execute.

To enable use of applications that require user input regardless of the power state of the host device, two (or more) different versions of an application type (e.g., two financial applications, two ticketing applications, etc.) can be loaded into a memory accessible by an NFC device (e.g., into separate NV memory 322). One version of the application can receive data entered on the host device, and the other version of the application can receive input from an external device (such as a POS device). Versions of the application that do not require the host device to be powered up can be executed when the NFC device is operating in a battery off mode (or a battery low mode). In an embodiment, the two applications can share resources, such as EE memory, keys, etc.

Some applications (e.g., financial applications) require access to a secure memory (e.g., separate NV memory 322). Even if the host device does not have sufficient power to accept user input, the NFC device may be able to harvest enough energy to power this secure memory so that the application can execute. Thus, embodiments of the present disclosure enable NFC devices to provide secure application support even when the NFC device is operating in a battery off mode.

In an embodiment of the present disclosure, NFC controller 306 is aware of the power mode that NFC device 300 is operating in. For example, controller 306 can be aware if NFC device 300 is operating in a full power mode, a low power mode a battery off mode. Controller 306 can detect that the NFC device has switched to a new power mode during activation or deactivation of the NFC device (e.g., according to European Telecommunications Standards Institute (ETSI) standard TS 102 613, which is hereby incorporated by reference in its entirety). Controller 306 can use this power mode information to determine which applications to include when a reader asks for a list of available applications.

While embodiments of the present disclosure are described above with reference to financial applications and ticketing applications, it should be understood that these applications are provided by way of example and are not limiting. One of ordinary skill in the art will appreciate that embodiments of the present disclosure are applicable to any type of application that has different versions for operation in a full power mode or in a battery of mode.

3.1 Secure Application Support with One Secure Element

As previously discussed, a variety of application types can be stored on the host device, including financial applications, ticketing applications, etc. In one embodiment, two versions of an application type can be loaded onto a host mobile device, and one of the two versions of the application can be selected based on the power mode of the NFC device. For example, a secure element (e.g., separate NV memory 422 or 424) on a mobile device (e.g., host device 400) can be loaded with two versions of a credit card application: (1) a mobile device financial application that interacts with the mobile device host to request PIN entry on the host; and (2) a contactless smart card financial application which emulates a contactless credit card. The first application can be enabled when full host battery supply is available, and the second application can be enabled when no (or, in an embodiment, low) host battery supply is available. The second application does, not require host power because, when the second application is enabled, the reader requests PIN entry on a POS device.

When the reader asks for a list of available applications, the secure element can respond with the applications relating to the current power mode the smart card emulation applications for battery off mode and mobile device applications for battery on mode). For example, in an embodiment, NV memory 422 is a secure memory and is loaded with two financial applications: (1) a first financial application that interacts with the mobile device host to request PIN entry on the host; and (2) a second financial application that emulates a contactless credit card. Controller 306 detects if NFC device 300 is operating in full power mode or battery off mode. When controller 306 receives a request for a list of available applications from a reader, controller indicates that either the first financial application or the second financial application is available depending on the battery mode of NFC device 300.

Embodiments of the present disclosure can also provide safeguards when enabling applications that do not require user input in battery off mode. For example, some relatively low cost transactions do not require PIN entry. To prevent wide-scale use of a lost or stolen mobile device, embodiments of the present disclosure can authorize a limited number of these transactions when the NFC device is operating in battery off mode. In an embodiment, a number of allowed low-cost transactions can be stored in memory to keep track of how many low-cost transactions have been performed. This number can be incremented or decremented each time a low-cost transaction is executed. In an embodiment, the number of allowed transactions can be reset again once a predetermined event has occurred (e.g., once a PIN has been entered using functionality on the mobile device.) In an embodiment, a user can set a cost threshold for determining which transactions will be supported in battery off mode. For example, while the NFC device may be initially configured to enable only those transactions under twenty dollars in battery off mode, a user may decide to raise this cost threshold to forty dollars. Additionally, in an embodiment, a user can set the number of battery off transactions allowed before the NFC device prevents use of these transactions in battery off mode. For example, while a NFC device may be initially configured to allow five transactions in battery off mode before requiring user authentication (e.g., via a password input on the host device), a user may raise this number of allowed transactions to ten allowed transactions in battery off mode.

For further example, a building authorization NFC device application may be configured to interact with a reader to authorize a user to enter a building. A full power version of this application may require user input (e.g., a biometric scan, voice recognition, or a PIN) on a host device (e.g., a mobile phone). A battery off version of this application may emulate a contactless card (which may or may not receive user input from an external device). In some cases, the full power version includes additional security measures, so it may be preferable. However, the battery off version may be useful in an emergency situation if no host power is available. In an embodiment of the present disclosure, the NFC device can allow the battery off version of the application to be used a limited number of times (e.g., by storing a counter in memory). Once this counter has reached a predetermined threshold value, the NFC device can prevent the battery off version from being used until an event occurs (e.g., until a user enters a password into the host device).

While embodiments of the present disclosure are described above with reference to financial applications and building authorization applications, it should be understood that these applications are provided by way of example and are not limiting. One of ordinary skill in the art will appreciate that embodiments of the present disclosure are applicable to any type of application that has different versions for operation in a full power mode or in a battery of mode.

Figure 5:
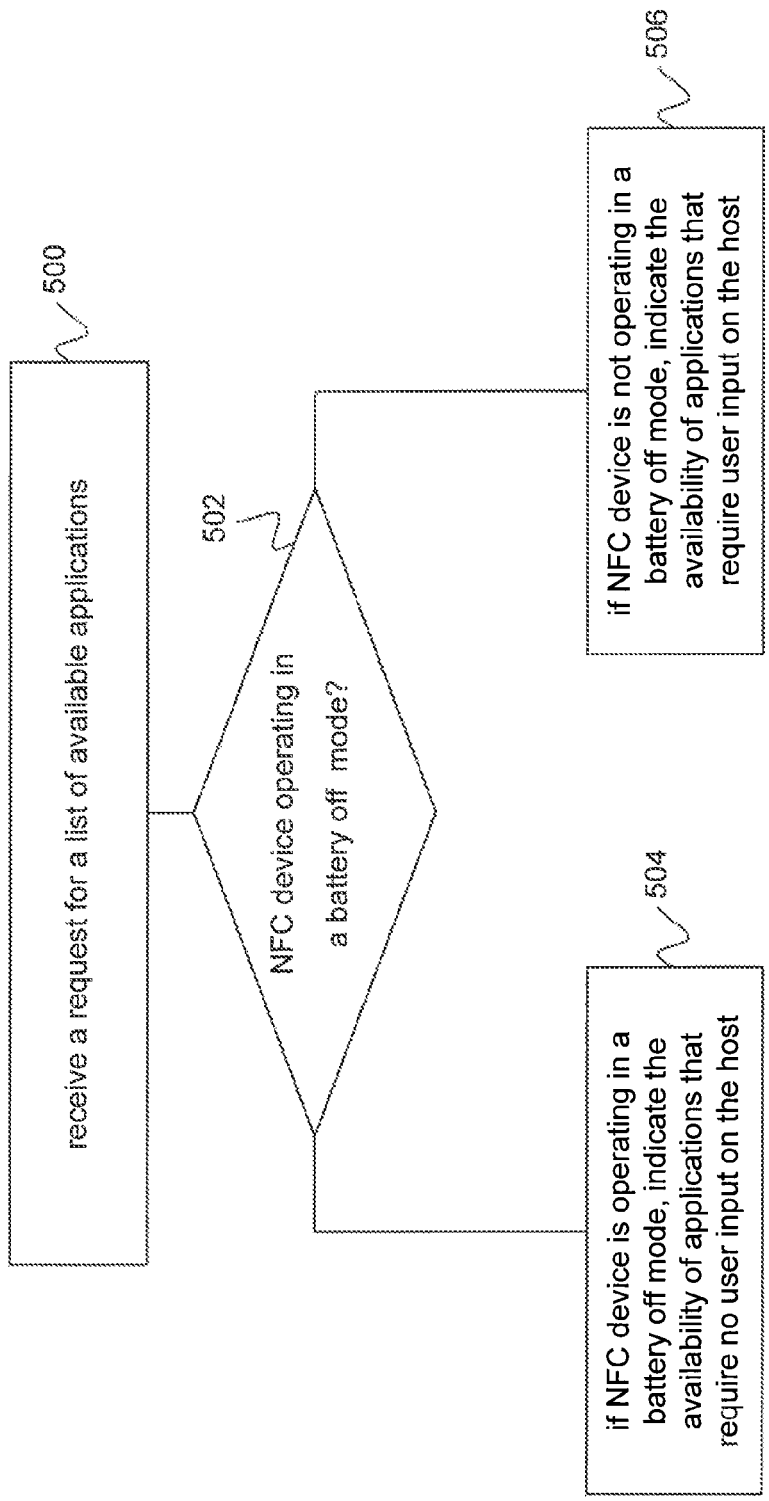
FIG. 5 is a flowchart of a method for providing secure application support for NFC devices in both battery on and battery off modes in accordance with embodiments of the present disclosure.

FIG. 5 is a flowchart of a method for providing secure application support for NFC devices in both battery on and battery off modes in accordance with an embodiment of the present disclosure. In step 500, a request for a list of available applications is received from a reader. In step 502, the power mode of the NFC device (e.g., NFC device 300) is determined. For example, controller 306 can determine whether NFC device 300 is operating in full power or battery off mode. Controller 306 responds to the reader indicating that either one or more applications requiring no host user input (step 504) are available or that one or more banking applications requiring host user input (step 506) are available depending on the power mode of the NFC device. For example, controller 306 can respond to the reader with an application identifier (AID) of an application that requires host user input if NFC device is operating in full power mode (i.e., if the host device has enough power to enable PIN entry on the host device). Controller 306 can respond to the reader with an application identifier (AID) of an application that does not require host user input if NFC device is operating in battery off or battery low mode (i.e., if the host device does not have enough power to enable PIN entry on the host device).

Figure 6:
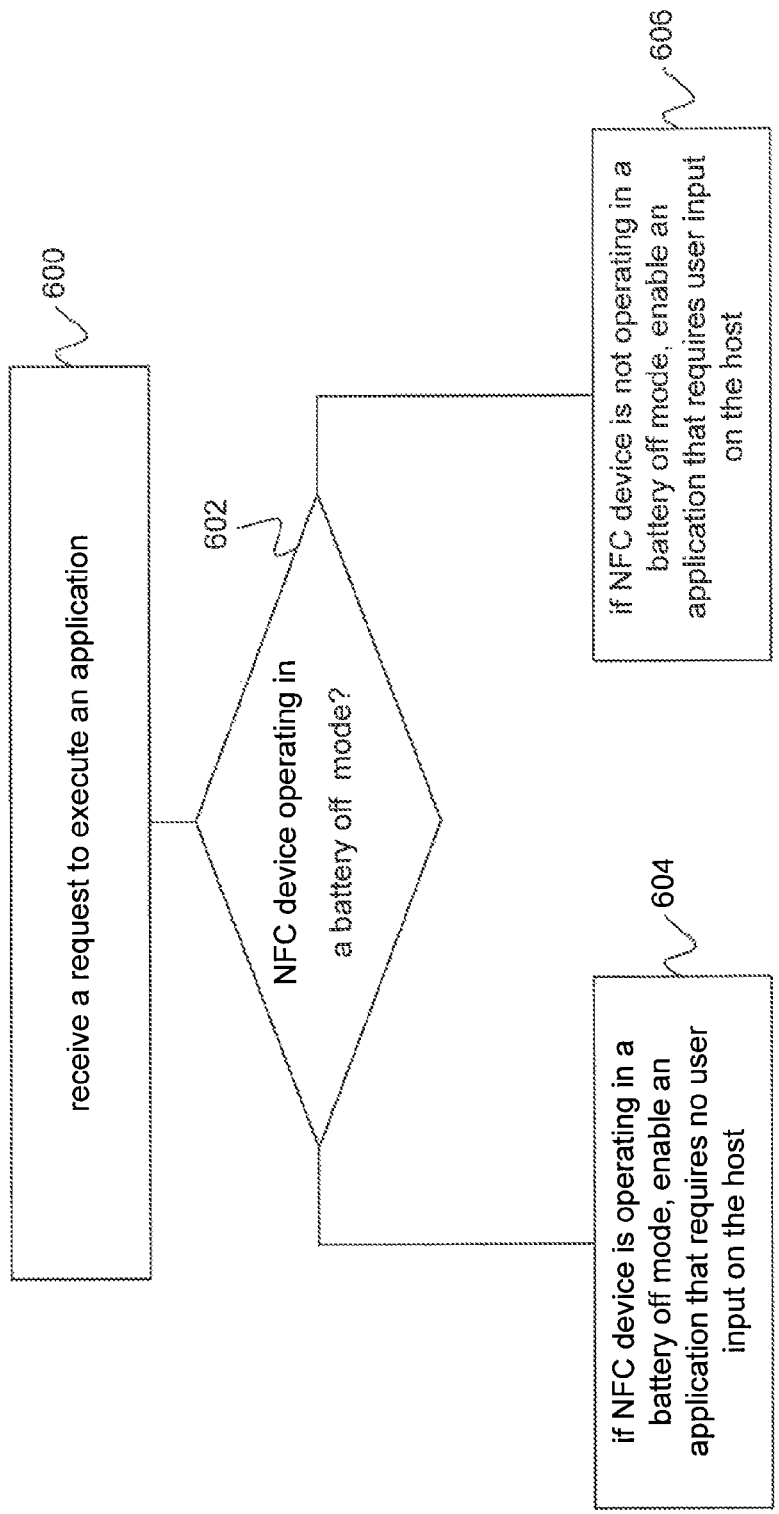
FIG. 6 is another flowchart of a method for providing secure application support for NFC devices in both battery on and battery off modes in accordance with embodiments of the present disclosure.

FIG. 6 is a flowchart of another method for providing secure application support for NFC devices in both battery on and battery off modes in accordance with an embodiment of the present disclosure. In step 600, a request to execute an application from a reader is received (e.g., by controller 306). In step 602, controller 306 determines the power mode of the NFC device. In step 604, an application requiring no user input is executed if the NFC device is operating in battery off mode. For example, if controller 306 determines that NFC device 300 is operating in battery off mode, controller 306 accesses secure memory 310, selects an application that emulates a contactless credit card, and executes this application. If the NFC device 300 is not operating in battery off mode, controller 306 executes an application that requires user input on the host in step 606. For example, if controller 306 determines that NFC device 300 is operating in full power mode, controller 306 accesses secure memory 310, selects a mobile device application that uses functionality on the host device implementing NFC device 300 (e.g., a mobile phone) for user input, and executes this application.

It should be noted that "full power mode" as described herein indicates that sufficient host power is available to process all NFC applications. "Full power mode" as described herein does not necessarily require that the battery of the host device be fully charged. While full power mode and battery off mode are discussed above, it should also be understood that one or more low power modes can be implemented in accordance with an embodiment of the present disclosure, and controller 306 can be aware if NFC device 300 is operating in any of these low power modes.

Further, it should be understood that "battery off mode" as described herein indicates that the host device does not have enough power to enable user input (e.g., entry of a PIN) on the host device. In other words, if the host device has some power, but not enough power to enable user input on the host device, controller 306 only indicates the availability of applications that require no user input on the host (e.g., step 504 in FIG. 5) and enables applications that require no user input on the host (e.g., step 604 in FIG. 6) in accordance with embodiments of the present disclosure.

3.2 AID Tables

NFC devices communicate using command-response pairs. Applications may be selected implicitly Or explicitly. In either case, a command to access an application contains an application identifier (AID). In an embodiment, each NFC device contains a list of supported applications and optional related data elements (e.g., an AID table). This AID table, may be stored, for example, in an OTP memory, an Electrically Erasable Programmable Read-Only Memory (EEPROM), or a flash memory of the NFC device. The list of AIDs in the AID table can be transmitted to a reader when the reader requests it. The reader may then issue a command to execute an application corresponding to one of the transmitted AIDs.

The AID table is used by the NFC controller once an NFC application enters a transaction mode (e.g., ISO 14443 level 4 transaction mode). At this point, the reader asks for a list of available applications. The NFC controller transmits the available application IDs to the reader, but if the controller is in low power or battery off mode, it withholds applications which have been flagged as requiring host power.

For example, this list of applications may be stored in a directory file, such as "EF.DIR," as described in International Standard ISO/IEC 7816-4, "Identification cards—Integrated circuit cards—Part 4: Organization, security and commands for interchange," published on Jan. 15, 2005, which is incorporated by reference herein in its entirety. The EF.DIR directory file contains a set of application identifiers and determines which commands shall be performed to select the applications. However, it should be understood that embodiments of the present disclosure are applicable to any table containing a list of applications and/or application identifiers.

In an embodiment, once the host communications device (e.g., host device 400) powers up, the communications device polls all secure elements (e.g., secure devices and/or secure memories) and updates an AID routing table with information regarding the status of any particular application. If multiple secure elements (e.g., multiple secure memories) are present in the host device, an extended application identifier (AID) table (e.g., as described by ISO 7816, which is incorporated by reference herein in its entirety) can be used. The AID table is compiled by the host by reading the AID lists out of all of the available secure elements and compiling the master NFC controller AID list. If multiple SE's are present, controller 306 can determine which SE to power up based on an identifier in the AID table indicating the location of the application (e.g., identifier 703).

FIG. 7A shows a block diagram of an extended AID table containing a list of AIDs 702, a location in memory 703 of the corresponding application, and (optionally) instructions 704 for executing the application 402, For example, in an embodiment, location "MEM1" can correspond to NV memory 422, and location "MEM2" can correspond to NV memory 424.

3.3 Application Support with Multiple Secure Elements

Embodiments of the present disclosure provide for the addition of a battery off enabled flag in the AID selection table for indicating the applications that can be executed when host power is not available. Because the controller can check flags in the AID table to determine which applications require battery support, multiple SE's are not required to be powered up to determine whether applications stored in the SE's require power. Thus, including this flag in the AID table can save power and enable the NFC device to operate more efficiently. The AID table can be updated when additional secure applications are added to the system.

FIG. 7B shows a "Battery Off Mode Enabled" column added to the table of FIG. 4A. It should be understood that the AIDs and instructions shown in FIGS. 4A and 4B are examples and serve to illustrate embodiments of the present disclosure. In accordance with an embodiment of the present disclosure, if an NFC device is executing in a battery off mode (or, in some embodiments, a battery low mode), the NFC device checks the corresponding battery off enabled flag 406 for an AID 702 referenced in a command prior to executing the instructions 704. In an embodiment, a battery off enabled flag 706 set to "1" indicates that an application should be enabled during battery off or battery low mode. However, those skilled in the art will also recognize that a battery off enabled flag 706 can also be set to "1" to indicate that an application should be disabled during battery off or battery low mode.

In an embodiment, AIDs that have a battery off enabled flag set to "0" (i.e., if battery-off mode is not enabled for the application) are not transmitted to a reader when the reader requests a list of available applications. Thus, in this embodiment, when a NFC device that is operating in the tag mode of operation is operating in battery off mode, the reader cannot request that applications with higher power requirements (e.g., applications that require PIN entry on the host device) be executed because the tag only transmits a list of applications with a battery off enabled flag set to "1" to the reader. Thus, the reader is not given the opportunity to request execution of applications with a battery off enabled flag set to "0." In another embodiment, the full list of AIDs is transmitted to the reader along with the corresponding battery off enabled flag so that the reader is aware that some applications will not be executed upon request. In another embodiment, the full list of AIDs is transmitted to a reader without the battery off enabled flag, and the NFC device that is operating in the tag mode of operation ignores requests to execute applications that have a battery off enabled flag set to "0."

For example, application 708 has a battery off enabled flag set to "1." In an embodiment, this flag indicates that application 708 can be executed in battery off mode. For example, application 708 can be a financial application that does not require PIN entry on the host device. Applications 709 and 710, on the other hand, have battery off enabled flags set to "0," indicating that applications 709 and 710 cannot be executed in battery off mode. For example, applications 709 and 710 can be applications that require PIN entry on the host device. Thus, in an embodiment, during battery off mode, only AID 708 is sent to a reader requesting a list of available applications. If the application associated with AID 708 is executed, only MEM2 (e.g., in an embodiment, NV memory 424) is powered-up so that the application can be executed.

It should be noted that some applications types can be executed regardless of whether host battery power is available. Some transport ticket applications may never require user input. For example, a transport ticket application may be configured to transmit information to a reader without ever having to prompt the user for user input. In such a case, loading two versions of the application (one operable for full power mode and one operable for battery off mode) onto the host device is not necessary. Rather, one version of the application can be loaded onto the host device, and the battery off mode enabled flag 706 for the application can be set to "1." Because the application does not require host battery power, the availability of the application in the list of AIDs can always be indicated to the reader when the reader requests a list of available applications.

For example, in an embodiment, application 711 is a transport ticketing application that does not ever require host power. When a reader requests a list of applications, application 711 is transmitted to the reader in the AID list regardless of whether the NFC device is operating in a full power mode or a battery off mode (or a battery low mode). Alternatively, in an embodiment, a different flag can be used to indicate applications that can be executed regardless of whether host power is available. For example, in an embodiment, battery off mode enabled flag 706 can be an integer, and application 711 can be assigned a battery off mode enabled flag of "2" to indicate that multiple versions of the application do not exist and that it can be executed regardless of whether host power is available.

Additionally, some applications requiring user input may never be executed in battery off mode. For example, some financial applications may not be configured to accept user input from a remote device because of security concerns. These financial applications may require that a user always enter a PIN on a host device. In such a case, two different versions of the financial application are not loaded onto the host device. Rather, a single version of the application can be loaded onto the host device, and the battery off mode enabled flag 706 for the application can be set to 0. If the battery off mode enabled flag 706 for the application is set to 0, the AID for the application will not be transmitted to a reader if the host device is operating in a battery off mode.

If additional secure elements are added to the host device, the AID table of FIG. 7B can be updated to include these elements. For example, if a third NV memory is added to host device 400, the AID table of FIG. 7B can be updated to include the AIDS 702, location fields 703, instructions 704, and battery of enabled flags 706 of applications stored within "MEM3."

FIG. 8 is a flowchart of a method for method for providing secure application support for NFC devices in both battery on and battery off modes in accordance with an embodiment of the present disclosure. In step 800, a request for a list of available applications is received from a reader. In step 802, the power mode of the NFC device (e.g., NFC device 300) is determined. For example, controller 306 can determine whether NFC device 300 is operating in full power or battery off mode. Controller 306 access an AID table (e.g., an AID table stored in memory module 310) containing fields 703 for the location in secure memory of all available applications and responds to the reader by sending portions of the AID table with battery off enabled flag set to 1 (step 804) or battery off enabled flag set to 0 (step 804) depending on the power mode of the host.

For example, controller 306 can accesses the AID table of FIG. 7B if a request for available applications is received from the reader. If no host power is available, controller 306 returns an AID table to the reader with rows 711 and 708 (i.e., the rows containing information for applications that are available for execution in battery off mode). If full power is available, controller 306 can return an AID table to the reader with rows 709 and 710 (i.e., the row information for the applications in FIG. 7B that are available for execution in fall power mode).

In an embodiment, controller 306 can return the full AID table (e.g., the AID table of FIG. 7B containing rows 710, 708, 709, and 711) if full power is available since applications that do not require host power can still be executed when full host power is available. In such a case, when a reader receives a list of AIDs, the reader can receive an AID list containing two different versions of an application (e.g., a full power version of the application that requires user input on the host device and a low power version that receives user input from an external device). If host power is available, the reader may want to select the full power version of the application. The reader can distinguish the full power version from the battery off version by checking the battery off enabled flags of the transmitted AID table. In some instances, the reader may prefer to select the lower power version of the application to conserve power.

4. Conclusion

It is to be appreciated that the Detailed Description section, and not the Abstract section, is intended to be used to interpret the claims. The Abstract section may set forth one or more but not all exemplary embodiments of the present invention as contemplated by the inventor(s), and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present invention.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A near field communication (NFC) device, comprising:
a processor;
a battery; and
a memory storing instructions, execution of which cause the processor to:
check a power level of the battery to determine a power mode of the NFC device,
receive a request for an application identifier (AID) from a communications device,
access a list of AIDs,
select a first AID in the list of AIDs corresponding to a first financial application as the AID if the NFC device is operating in a full power mode,
select a second AID in the list of AIDs corresponding to a second financial application as the AID if the NFC device is operating in a battery off mode, and
transmit the AID to the communications device.

2. The NFC device of claim 1, wherein the first financial application is configured to interact with the NFC device to request entry of a personal identification number (PIN) on the NFC device, and wherein the second financial application is configured to emulate a contactless credit card.

3. The NFC device of claim 1, wherein the first financial application is configured to interact with the NFC device to request entry of a personal identification number (PIN) on the NFC device, and wherein the second financial application is configured to process transactions that do not require entry of the PIN.

4. The NFC device of claim 1, wherein the list of AIDs comprises an AID table, and wherein the instructions further cause the processor to:
access information in the AID table indicating which applications are configured to be executed in the battery off mode; and
select, based on the accessed information, the first AID or the second AID.

5. A near field communication (NFC) device, comprising:
a processor;
a battery; and
a memory storing instructions, execution of which cause the processor to:
check a power level of the battery to determine a power mode of the NFC device,
receive a request for an application identifier (AID) from a communications device,
access a list of AIDs,
select a first AID in the list of AIDs corresponding to a first financial application as the AID if the NFC device is operating in a first power mode,
select a second AID in the list of AIDs corresponding to a second financial application as the AID if the NFC device is operating in a second power mode, and
transmit the AID to the communications device.

6. The NFC device of claim 5, wherein the first power mode is a full power mode, and wherein the second power mode is a battery off mode.

7. The NFC device of claim 6, wherein the instructions further cause the processor to:
access a battery off enabled flag entry in entries of the list of AIDs to access information indicating which applications are configured to be executed in the battery off mode.

8. The NFC device of claim 5, wherein the first financial application is configured to interact with the NFC device to request entry of a personal identification number (PIN) on the NFC device, and wherein the second financial application is configured to emulate a contactless credit card.

9. The NFC device of claim 5, wherein the first financial application is configured to interact with the NFC device to request entry of a personal identification number (PIN) on the NFC device, and wherein the second financial application is configured to process transactions that do not require entry of the PIN.

10. The NFC device of claim 5, wherein the list of AIDs comprises an AID table, and wherein the instructions further cause the processor to:
access information in the AID table indicating which applications are configured to be executed in the second power mode; and
select, based on the accessed information, the first AID or the second AID.

11. A method, comprising:
- checking, using a processor, a power level of a battery to determine a power mode of a near field communication (NFC) device;
- receiving, using the processor, a request for an application identifier (AID) from a second NFC device;
- accessing, using the processor, a list of AIDs;
- selecting, using the processor, a first AID in the list of AIDs corresponding to a first financial application as the AID if the NFC device is operating in a first power mode;
- selecting, using the processor, a second AID in the list of AIDs corresponding to a second financial application as the AID if the NFC device is operating in a second power mode; and
- transmitting, using the processor, the AID to the second NFC device.

12. The method of claim 11, wherein the first power mode is a full power mode, and wherein the second power mode is a battery off mode.

13. The method of claim 12, further comprising:
- accessing a battery off enabled flag entry in entries of the list of AIDs to access information indicating which applications are configured to be executed in the battery off mode.

14. The method of claim 11, wherein the first financial application requests entry of a personal identification number (PIN), and wherein the second financial application emulates a contactless credit card.

15. The method of claim 11, wherein the first financial application requests entry of a personal identification number (PIN), and wherein the second financial application processes transactions that do not require entry of the PIN.

16. The method of claim 11, wherein the list of AIDs comprises an AID table, and wherein the method further comprises:
- accessing information in the AID table indicating which applications are configured to be executed in the second power mode; and
- selecting, based on the accessed information, the first AID or the second AID.

17. The method of claim 11, wherein the second financial application is a low power version of the first financial application.

18. The method of claim 11, further comprising:
- loading the first financial application onto a host mobile device; and
- loading the second financial application onto the host mobile device, wherein the second financial application is a low power version of the first financial application, and wherein the second financial application is configured to be enabled when the battery has no power.

19. The NFC device of claim 5, wherein the memory stores the first financial application and the second financial application, wherein the second financial application is a low power version of the first financial application, and wherein the second financial application is configured to be enabled when the battery has no power.

* * * * *